(12) United States Patent
Gupta et al.

(10) Patent No.: US 7,884,339 B2
(45) Date of Patent: Feb. 8, 2011

(54) COLOR INDICATOR DOSIMETER FOR MEASUREMENT OF IONIZING RADIATION

(75) Inventors: Sumit Gupta, Mumbai (IN); Suchandra Chatterjee, Mumbai (IN); Prasad S. Variyar, Mumbai (IN); Arun Sharma, Mumbai (IN)

(73) Assignee: Secretary, Department of Atomic Energy, Mumbai (IN)

( * ) Notice: Subject to any disclaimer, the term of this patent is extended or adjusted under 35 U.S.C. 154(b) by 191 days.

(21) Appl. No.: 12/250,981

(22) Filed: Oct. 14, 2008

(65) Prior Publication Data

US 2010/0090128 A1    Apr. 15, 2010

(51) Int. Cl.
*G01N 21/78* (2006.01)
(52) U.S. Cl. .................. 250/473.1; 250/482.1
(58) Field of Classification Search .............. 250/484.5, 250/474.4, 473.1, 482.1
See application file for complete search history.

(56) References Cited

U.S. PATENT DOCUMENTS

| | | | |
|---|---|---|---|
| 4,097,226 | A | 6/1978 | Erikson et al. |
| 4,788,126 | A | 11/1988 | Feldman et al. |
| 5,099,132 | A | 3/1992 | Ueno et al. |
| 5,527,349 | A | 6/1996 | Landry et al. |
| 6,582,657 | B2 | 6/2003 | Warner et al. |

OTHER PUBLICATIONS

Nuclear India, Unit-3 of Kaiga Atomic Power Project—3 & 4 declared commerial, May-Jun. 2007, Nuclear India, vol. 40 No. 11-12.*

* cited by examiner

*Primary Examiner*—David P Porta
*Assistant Examiner*—Djura Malevic
(74) *Attorney, Agent, or Firm*—Merchant & Gould P.C.

(57) ABSTRACT

The present invention provides a color indicator dosimeter system to detect and quantify a dosage of ionizing radiation in a wide range wherein said system comprises phenolic glycoside as one of the components. The present invention also relates to a method for using dosimeter system as described hereinabove for detecting and quantifying a dosage of ionizing radiation in a wide range.

9 Claims, 6 Drawing Sheets

COLOR INDICATOR DOSIMETER FOR MEASUREMENT OF IONIZING RADIATION

FIELD OF THE INVENTION

The present invention relates to a dosimeter system and a method for using the same. More particularly, the invention relates to a dosimeter and method for using the same to detect and quantify a dosage of ionizing radiation in a wide range.

BACKGROUND AND THE PRIOR ART

Many aroma components are present in bound form in food materials and a majority of them are bound with carbohydrates with β-D-linkages. This was first shown by Gunata et al in grapes.

To improve flavor of food products researchers are using glycosidase enzymes for breaking β-D-linkage. Breakdown of aroma glycosides during irradiation processing was first shown by present group while working on nutmeg. Previous studies showed some increase in phenolic acids and aroma due to irradiation processing but the type of linkage broken i.e. whether ester as in case of phenolic acid or β-D as in case of aroma glycosides was not confirmed.

While working on fenugreek irradiation it was found that volatile phenol is being released. Further studies confirmed that phenol was released due to breakdown from phenyl glucoside.

Color indicator dosimeters of ionizing radiation are widely employed for determining and monitoring the dosage of ionizing radiation (gamma rays, X-rays and high-energy electrons) in a broad range of doses and dose rates There exist a range of color indicator dosimeters of ionizing radiation, a majority of them incorporates an acid sensitive dye responsive to ionizing radiation. Which changes color on exposure to such radiation Methyl red, methyl orange, dimethyl yellow are few examples for above said dosimeters.

It is known in art dosimeters based on ferrous ammonium sulfate (FX), which are currently used as reference standard. Aforesaid FX dosimeters are available with many variations suitable for different dose ranges.

U.S. Pat. No. 4,001,587 discloses a color indicator-dosimeter of ionizing radiation, comprising from 70 to 100 parts by weight of a thermoplastic polymer, from 10 to 40 parts by weight of a plasticizer, from 0.5 to 3.0 parts by weight of a stabilizer and two dyes compatible with said polymer, one of said dyes being incorporated in the color indicator-dosimeter to the extent of from 0.007 to 0.01 part by weight and having a G value of decolorization in said polymer of from 0.05 to 0.1 molecule/100 eV, with the absorption maximum thereof lying in the 450 to 590 nm spectral range, whereas the other of said two dyes is incorporated in the color indicator-dosimeter to the extent of from 0.015 to 0.03 part by weight and has a G value of decolorization in said polymer of from 0.15 to 1.5 molecule/100 eV, with the absorption maximum thereof lying in the 600 to 720 nm spectral range.

U.S. Pat. No. 6,582,657 discloses a dosimeter that detects ionizing radiation, comprising: (a) a breakable sealed container; (b) a solution comprising a reducing agent inside said sealed container; (c) a silver salt (AgX) selected from the group consisting of silver chloride, silver bromide, silver iodide, and mixtures thereof; and (d) an air-tight dosimeter body having a transparent portion and an opaque portion, said transparent portion including a transparent chamber for receiving said sealed breakable container, said opaque portion including an opaque chamber for receiving the silver salt and a winding passageway that separates and provides fluid communication between said transparent chamber and said opaque chamber.

U.S. Pat. No. 5,099,132 a dosimeter comprising a support having provided thereon a radiation-sensitive (color-changing) layer which comprises (a) a polymer containing halogen atoms or a polymer containing acetic acid groups and (b) a pH-sensitive indicator dye capable of changing color according to the change in pH.

U.S. Pat. No. 4,057,226 discloses a mixing device comprising a vessel and an agitator extending into the vessel and formed by an approximately vertical shaft and approximately radially extending blades, said agitator being eccentrically journalled in the vessel and being such that it describes a closed path.

U.S. Pat. No. 4,788,126 discloses a radiation dosimeter comprising a support having a layer of microcapsules on the surface thereof, said microcapsules containing an image-forming agent and a radiation curable composition, said composition being essentially insensitive to visible light and ultraviolet radiation and being sensitive to gamma electron beam radiation such that when exposed to gamma or electron beam radiation, said composition polymerizes and hardens said microcapsules.

U.S. Pat. No. 5,527,349 discloses a method of monitoring photochemotherapy during treatment of abnormal tissue which comprises directing photochemotherapy radiation to an abnormal tissue; providing at least one photochemotherapy dosimeter having an optical fiber and a chemical cell attached to an end of said optical fiber which chemical cell contains a photobleachable chemical; positioning said at least one photochemotherapy dosimeter near said abnormal tissue so that said chemical cell of said at least one photochemotherapy dosimeter receives said photochemotherapy radiation; and detecting changes in optical radiation absorption of said photobleachable chemical in said chemical cell.

One of the disadvantages of the indicator dosimeters presently available stem directly from the use of acid sensitive dye as the element responsive to ionizing radiation. Dyes of this sort are pH indicators, changing their color while reacting with an acid, which is formed during radiation of dosimeter.

Dye based indicators have poor light stability in pre as well as post irradiation condition. Also FX based dosimeters have a disadvantage that they are not applicable to both lower and high dose measurements. Also, above said FX based systems give non-linear response at higher doses.

The present inventors have now found that the use of phenolic glycoside based color indicator dosimeters permits detection and measurement of ionizing radiation in a wide range of 20 Gy to 25 kGy. Moreover phenolic glycosides provide stable solutions both in pre as well as post irradiation conditions. Further the dosimeter as described in the present invention is simple to use, and does not require expensive and sophisticated equipments like ESR (Electron spin resonance) for measurement of dose.

Present dosimeter uses food grade material, which can be advantageous for food irradiation applications.

OBJECTS OF THE INVENTION

Accordingly, one object of the present invention is to overcome the disadvantages prevailing in the prior art.

Another object of the present invention is to provide a color indicator dosimeter.

Another object of the present invention is to provide a phenolic glycoside based color indicator dosimeter for quantifying absorbed doses of ionic radiation in a wide range.

Yet another object of the present invention is to develop a dosimeter with cheap and easy methodology.

SUMMARY OF THE INVENTION

According to the basic aspect of the present invention, there is provided a color indicator dosimeter system to detect and quantify a dosage of ionizing radiation in a wide range wherein said system comprises phenolic glycoside as one of the components.

Another aspect of the present invention is to provide a method for using dosimeter system as described hereinabove for detecting and quantifying a dosage of ionizing radiation in a wide range.

DETAILED DESCRIPTION OF THE INVENTION

According to the present invention there is provided a phenolic glycoside based color indicator dosimeter to detect and quantify a dosage of ionizing radiation in a wide range used for processing food.

Any of phenolic glycoside can be used but we have taken phenyl-β-Dglucoside and para-nitrophenyl-β-D-glucoside to show the manufacturing and functioning of system.

According to the present invention phenolic glycoside is dissolved in distilled water. Particularly, glass vials along with buildup to maintain electronic balance are used for irradiation instead of plastic vials, as present dosimeter is sensitive to R radical formed in plastic vials during radiation. After taking phenolic glycoside solution in vials with buildup it can be used for irradiation. When this is irradiated, phenol and glycoside moiety were released. Phenol can be quantified and can be correlated to absorbed dose. For quantification of phenol in case of phenyl-β-D-glucoside various methods are used for demonstration. Methods used are Prussian blue, Folin's and direct O D measurement at 279.3 nm and in case of para-nitrophenyl-β-D-glucoside direct absorbance was taken in basic medium.

FLOW CHART FOR SYSTEM

Amount of Phenol is now correlated to absorbed dose.

In present study Prussian blue, Folin's assay and direct O.D. measurement at 297.3 nm was used for phenol quantification but various other assays can also be used.

| 1) Dose range | 20 Gy-25 kGy |
|---|---|
| 2) Minimum detectable limit | 20 Gy |
| 3) Resolution | 20 Gy |
| 4) Effect of dose rate | No |
| 5) Effect of Volume | No |

The present invention is further described by way of illustrating examples.

Example 1

Making of standard curve of O D Vs absorbed dose and finding out absorbed dose of two samples irradiated for a given time by dosimeter using phenyl-$\beta$-D-glucoside and Prussian blue method in dose range of 50-1000 Gy For making standard curve following solutions were made a) Concentration of stock solution of phenyl-$\beta$-D-glucoside for irradiation: 39 mM in distilled water b) Concentration of ferric chloride 0.02 Molar m 1N HCL c) Concentration of potassium ferricyanide 0.008 Molar in 1N HCL The solution of phenyl-$\beta$-D-glucoside is irradiated for following doses each one in triplicate.

a) 50 Gy
b) 100 Gy
c) 200 Gy
d) 400 Gy
e) 1000 Gy

After irradiation 0.5 ml of sample is taken and total volume is made 3 ml with distilled water (final conc.: 6.5 mM). In this 3 ml-solution 0.2 ml of 0.02M ferric chloride and 0.008M potassium ferricyanide was added and incubation period of ten minutes was given for color development.

After ten minutes incubation O. D. was taken at 700 nm and readings were obtained as shown below:

| | Readings O.D. | Blank: 0.145 | | | |
|---|---|---|---|---|---|
| Dose (Gy) | A | B | C | Average | Average-blank |
| 50 | 0.191 | 0.189 | 0.19 | 0.19 | 0.045 |
| 100 | 0.217 | 0.217 | 0.217 | 0.217 | 0.072 |
| 200 | 0.27 | 0.264 | 0.268 | 0.267 | 0.122 |
| 400 | 0.369 | 0.366 | 0.356 | 0.363 | 0.218 |
| 1000 | 0.613 | 0.694 | 0.68 | 0.662 | 0.517 |

Figure 1:
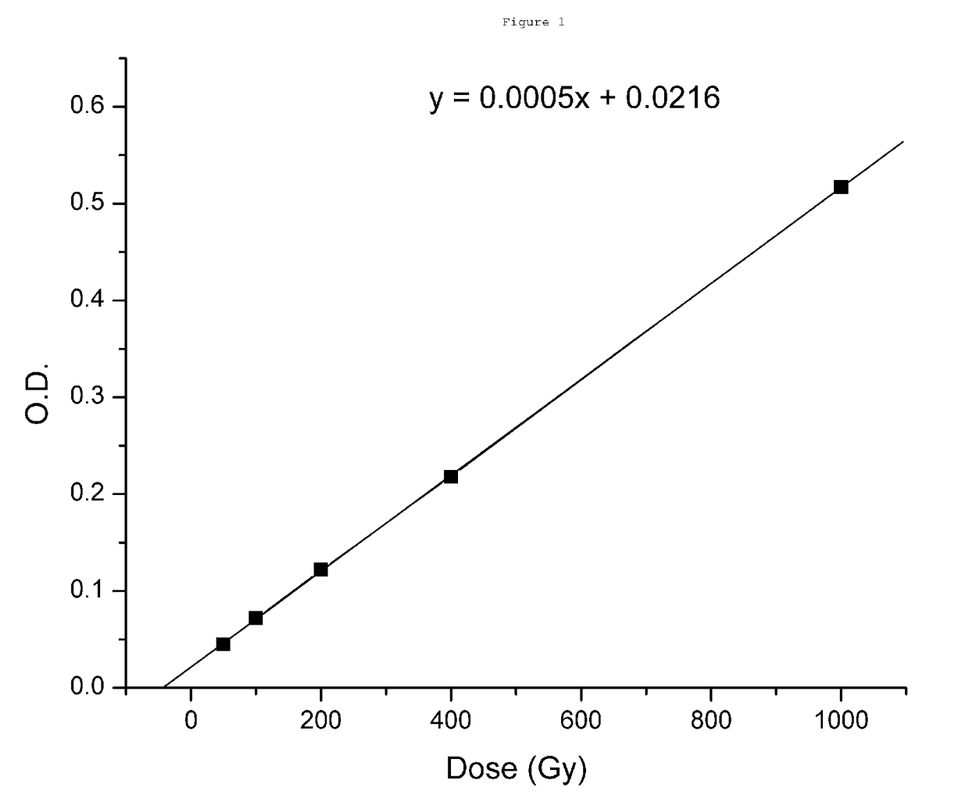
FIG. 1 shows a standard curve of Dose Vs O.D. at 700 nm as described in Example 1.

After that standard curve was drawn, Dose Vs O.D. at 700 nm as shown in FIG. 1.

For calculating unknown doses, two samples were irradiated and their O.D. was taken as described above for standard solution. Readings obtained are given below:

Readings:

| Sample No | Dose given | O.D. |
|---|---|---|
| Sample A | 80 Gy | 0.06 |
| Sample B | 160 Gy | 0.096 |

For the O.D. obtained above corresponding absorbed dose was calculated from standard curve using equation: O.D.=0.0005 (dose)+0.0216

Results Obtained are as Following:

| Sample No. | Dose given | O.D. | Dose from standard curve | error |
|---|---|---|---|---|
| Sample A | 80 Gy | 0.06 | 77 Gy | 3.75% |
| Sample B | 160 Gy | 0.096 | 150 Gy | 6.25% |

Example 2

A standard curve of O.D. Vs absorbed dose is prepared and absorbed dose of sample irradiated for a given time is quantified by dosimeter using phenyl-$\beta$-D glucoside and direct O.D. measurement of irradiated solution at 279.3 nm in dose range of 100-1000 Gy For Making Standard Curve Following Solutions were Made:
d) Concentration of stock solution of phenyl-$\beta$-D glucoside for irradiation 39 mM in distilled water.

The standard solution of phenyl-$\beta$-D glucoside is irradiated for following doses each one in triplicate.
a) 100 Gy
b) 200 Gy
c) 500 Gy
d) 1000 Gy After irradiation solution was diluted to 29 mM concentration and O.D was taken at 279.3 nm against unirradiated sample as blank. Following readings were obtained.

| Dose (Gy) | O.D. |
|---|---|
| 100 | 0.066 |
| 500 | 0.192 |
| 800 | 0.266 |
| 1000 | 0.322 |

Figure 2:
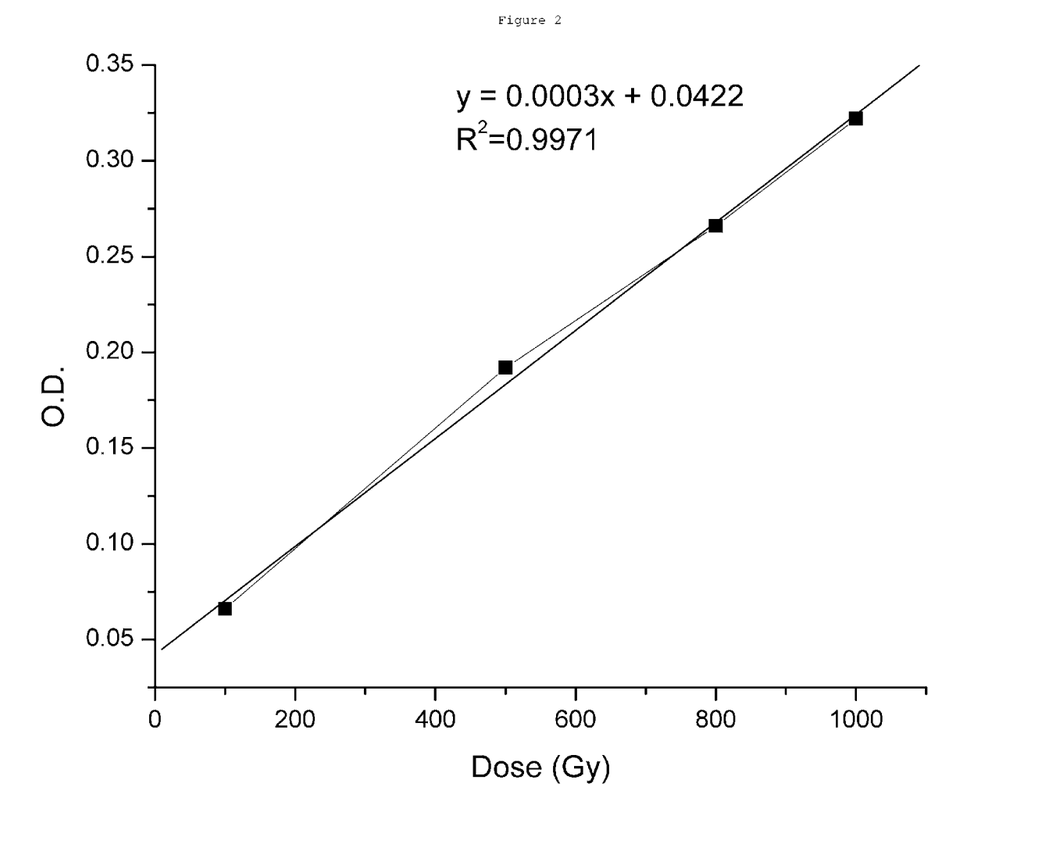
FIG. 2 shows a standard curve of Dose vs O.D. at 279.3 nm as described in Example 2.

Standard curve of Dose vs O.D. was drawn as shown in FIG. 2

For calculating the unknown doses dosimetry solution was irradiated at 200 Gy and O.D. measured at 279.3 nm. value obtained was 0.105. Unknown dose was calculated based on equation: y=0.0003 x+0.0422

| Value obtained | Actual value | Error |
|---|---|---|
| 209 Gy | 200 | 4.5% |

Example 3

Making of standard curve of O.D. Vs absorbed dose and finding out absorbed dose of samples in irradiated for a given time by dosimeter using phenyl-β-D glucoside and Folin's assay for phenol quantification in dose range 250-1000 Gy For Making Standard Curve Following Solutions were Made
  a) Concentration of stock solution of phenyl-β-D glucoside for irradiation 39 mM in distilled water.
  b) $Na_2CO_3$ in distilled water 6% w/v
  c) 1:1 diluted Folin's reagent Now, this standard solution of phenyl-β-D glucoside is irradiated for following doses, each one in triplicate.
  a. 250 Gy
  b. 400 Gy
  c. 600 Gy
  d. 800 Gy
  e. 1000 Gy After irradiation 100 ul of Folin's reagent and 500 ul of $Na_2CO_3$ solution was added to 1 ml of irradiated solution. Reaction mixture was incubated for 30 minutes and O.D. was taken at 750 nm.

Following Values were Obtained:

| Dose (Gy) | O.D |
|---|---|
| 250 | 0.446 |
| 400 | 0.675 |
| 600 | 0.900 |
| 800 | 1.084 |
| 1000 | 1.29 |

Figure 3:
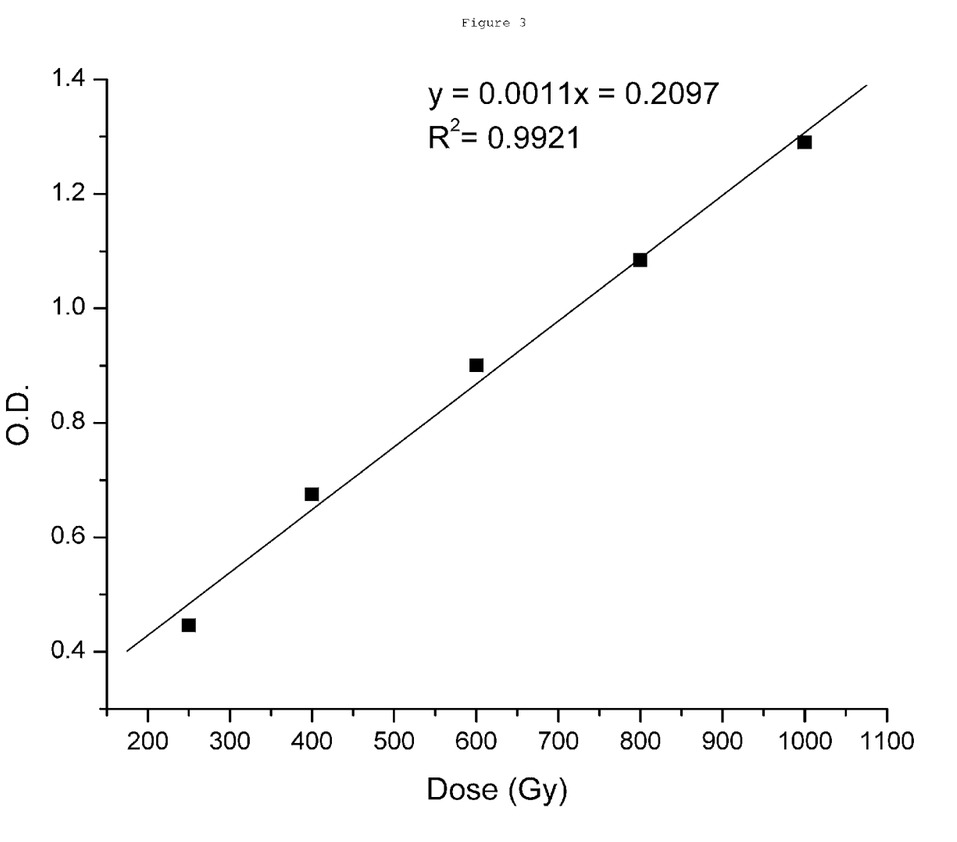
FIG. 3 shows a standard curve of Dose vs O.D. at 750 nm as described in Example 3.

Standard curve of Dose vs O.D. was obtained as shown in FIG. 3

For calculating unknown doses dosimetry solution was irradiated at 450 Gy and O.D. obtained was 0.72 and doses were calculated based on above equation.

| Value obtained | Actual value | Error |
|---|---|---|
| 463 Gy | 450 | 2.8% |

Example 4

Making of standard curve of O.D. vs absorbed dose and finding out absorbed dose of samples irradiated for a given time by dosimeter using phenyl-β-D glucoside and Folin's assay for phenol quantification in dose range of 1-10 kGy Solutions were made as in example 3 and following doses were given in triplicates 1 kGy 5 kGy 10 kGy After irradiation stock solution were diluted six times to 6.5 mM. In reaction mixture 1 ml of this diluted solution along with 100 ul of 1:1 diluted Folin's reagent and 500 ul of 6% $Na_2CO_3$ was added. Reaction mixture was incubated for half and hour and O.D. taken at 750 nm.

Following Readings were Obtained:

| Dose (kGy) | O.D. |
|---|---|
| 1 | 0.262 |
| 5 | 0.793 |
| 10 | 1.557 |

Figure 4:
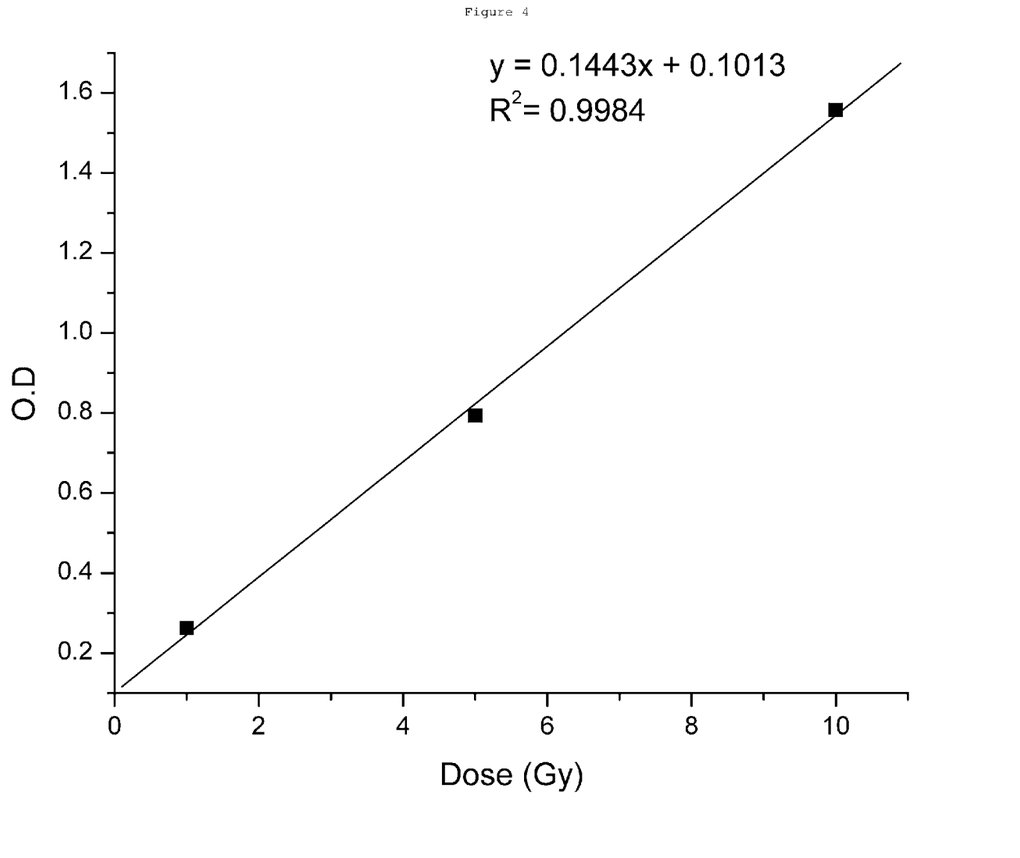
FIG. 4 shows a standard curve of Dose vs O.D. at 750 nm as described in Example 4.

Standard curve was obtained as shown in FIG. 4

For calculating unknown doses dosimetry solution was irradiated at 3.5 kGy and O.D. as stated above was taken. Then according to regression equation in graph absorbed dose was calculated.

| Value obtained | Actual value | Error |
|---|---|---|
| 3.345 kGy | 3.5 | 4.42% |

Example 5

Making of standard curve of O.D. vs absorbed dose and finding out absorbed dose of samples irradiated for a given time by dosimeter using phenyl-β-D glucoside and Folin's assay for phenol quantification in dose range of 10-25 kGy.

For Making Standard Curve Following Solutions were Made:
  a) Concentration of stock solution of phenyl-β-D glucoside for irradiation: 58.5 mM in distilled water.
  b) $Na_2CO_3$ in distilled water: 6% w/v
  c) 1:1 diluted Folin's reagent.

Now, this standard solution of phenyl-β-D glucoside is irradiated for following doses, each one in triplicate:
  a. 10 kGy
  b. 15 kGy
  c. 25 kGy After irradiation stock solution were diluted twenty times to 2.9 mM. In reaction mixture 1 ml of this diluted solution along with 100 ul of 1:1 diluted Folin's reagent and 500 ul of 6% $Na_2CO_3$ was added. Reaction mixture was incubated for half an hour and O.D taken at 750 nm.

Following Readings were Obtained:

| Dose (kGy) | O.D |
|---|---|
| 10 | 0.567 |
| 15 | 0.667 |
| 25 | 0.978 |

Figure 5:
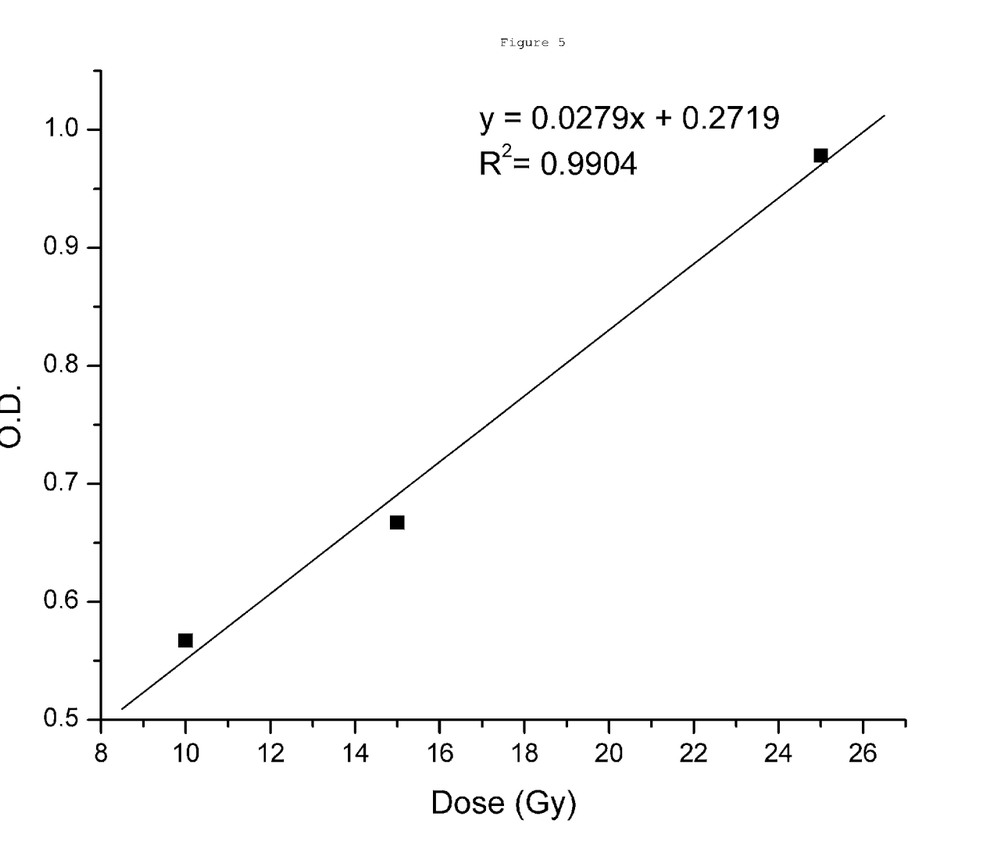
FIG. 5 shows a standard curve plotted Dose vs O.D. at 750 nm as described in Example 5.

Standard curve was plotted as shown in FIG. 5

For calculating unknown doses dosimetry solution was irradiated at 20 kGy and O.D. as stated above was taken. Then according to regression equation in graph absorbed dose was calculated:

| Value obtained | Actual value | Error |
|---|---|---|
| 20.89 kGy | 20 | 4.45% |

Example 6

Making of standard curve of O.D Vs absorbed dose and finding out absorbed dose of samples irradiated for a given time by dosimeter using para-nitrophenyl-β-D glucoside in dose range of 100-1000 Gy.

Preparation of stock solution was carried out in similar manner as described in example 1. Then stock solution (0.5 ml) was irradiated for following doses in duplicate.

a) 100 Gy
b) 200 Gy
c) 500 Gy
d) 1000 Gy 0.1 M Glycine buffer (pH 10) was then added to make volume 3.0 ml. Para-nitrophenol, which is released, gives yellow color in basic solution so O.D was taken at 420 nm.

Following are the Observation:

|  | Readings | | | |
|---|---|---|---|---|
| Dose (Gy) | A | B | Average | Average-blank |
| 100 | 0.041 | 0.038 | 0.0395 | 0.0095 |
| 200 | 0.067 | 0.064 | 0.0655 | 0.0355 |
| 400 | 0.133 | 0.128 | 0.1305 | 0.1005 |
| 1000 | 0.25 | 0.223 | 0.2365 | 0.2065 |

Figure 6:
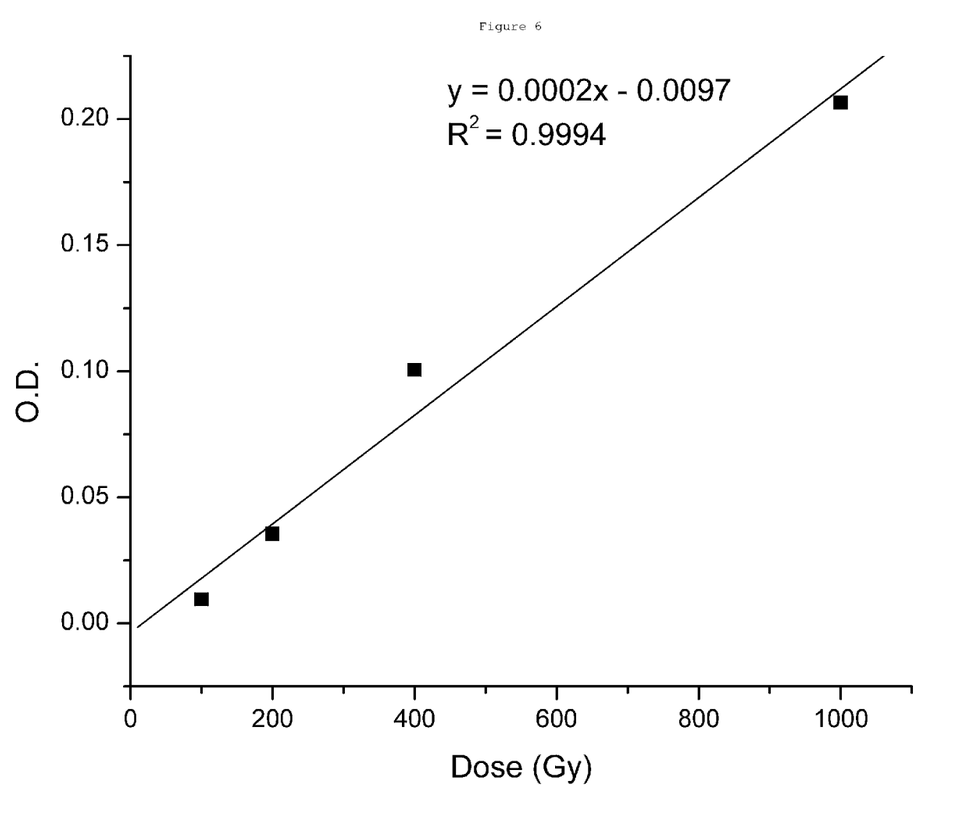
FIG. 6 shows a standard curve of Dose vs O.D. at 420 nm plotted as described in Example 6.

Standard curve of Dose vs O.D. is plotted as shown in FIG. 6

For calculating unknown doses, two samples were irradiated and their O.D was taken as described above for standard solution. Readings obtained are given below:

Readings:

| Sample No. | Dose delivered | O.D. |
|---|---|---|
| Sample A | 1050 | 0.204 |

For the O.D. obtained above corresponding absorbed dose was calculated from standard curve using equation: O.D.=0.0002 (dose)−0.0097

Result Obtained are as Following:

| Sample No. | Dose delivered | O.D. | Dose from standard curve | Error |
|---|---|---|---|---|
| Sample A | 1050 Gy | 0.204 | 1060 Gy | 1% |

As the foregoing results demonstrate the dosimeter of the present invention permits easy and convenient determination of exposure dose in range from low exposure dose to a high exposure dose.

While the invention has been described in detail and with reference to specific examples, it will be apparent to one skilled in art that various changes and modifications can be made therein without departing from the spirit and scope thereof.

The invention claimed is:

1. A color indicator dosimeter system to detect and quantify a dosage of ionizing radiation in a wide range wherein said system comprises para-nitrophenyl-β-D-glucoside as one of the components and having a defined resolution.

2. System as claimed in claim 1 wherein the ionizing radiation ranges from 20 Gy to 25 kGy.

3. System as claimed in claim 1 wherein the para-nitrophenyl-β-D-Glucoside is in powder form.

4. System as claimed in claim 1 wherein the para-nitrophenyl-β-D-Glucoside is in solution form.

5. System as claimed in claim 1 adapted for in situ dosimetry in the range of 20Gy to 25 kGy.

6. A method for using dosimeter system as claimed in claim 1 for detecting and quantifying a dosage of ionizing radiation in a wide range.

7. Method as claimed in claim 6 comprising steps of:
   (i) dissolving para-nitrophenyl-β-D-Glucoside in distilled water thereby preparing stock solution;
   (ii) irradiating said stock solution at different doses to form phenol and glycoside moiety;
   (iii) quantifying phenol; and
   (iv) correlating amount of phenol to absorbed dose.

8. The system of claim 1, wherein the system is configured to detect and quantify a dosage of ionizing radiation at a resolution of 20 Gy.

9. The method of claim 7, comprising detecting and quantifying a dosage of ionizing radiation at a resolution of 20 Gy.

* * * * *